United States Patent
Mayuzumi

(10) Patent No.: US 9,374,525 B2
(45) Date of Patent: Jun. 21, 2016

(54) SHOOTING APPARATUS AND SHOOTING METHOD

(71) Applicant: OLYMPUS CORPORATION, Shibuya-ku, Tokyo (JP)

(72) Inventor: Tadataka Mayuzumi, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 94 days.

(21) Appl. No.: 14/295,043

(22) Filed: Jun. 3, 2014

(65) Prior Publication Data

US 2015/0002701 A1    Jan. 1, 2015

(30) Foreign Application Priority Data

Jul. 1, 2013    (JP) .................................. 2013-138069

(51) Int. Cl.
*H04N 5/232* (2006.01)

(52) U.S. Cl.
CPC ....... *H04N 5/23229* (2013.01); *H04N 5/23245* (2013.01); *H04N 5/23293* (2013.01)

(58) Field of Classification Search
CPC .......... H04N 5/23229; H04N 5/23245; H04N 5/23293
See application file for complete search history.

(56) References Cited

U.S. PATENT DOCUMENTS

| | | | |
|---|---|---|---|
| 8,300,064 B2 | 10/2012 | Yamaji et al. | |
| 2003/0095720 A1* | 5/2003 | Chiu ....................... | H04N 5/262 382/284 |
| 2004/0064207 A1* | 4/2004 | Zacks ................ | G06F 17/30787 700/91 |
| 2008/0117310 A1* | 5/2008 | Kaneda .............. | H04N 5/23212 348/231.2 |
| 2010/0039527 A1* | 2/2010 | Kretz .................. | H04N 5/23219 348/222.1 |
| 2011/0029635 A1* | 2/2011 | Shkurko ............... | G06F 17/248 709/217 |
| 2011/0050956 A1* | 3/2011 | Bessho .................. | H04N 5/772 348/231.3 |
| 2011/0242336 A1* | 10/2011 | Yamaji ................... | H04N 1/387 348/207.2 |
| 2012/0020648 A1* | 1/2012 | Yamaji ................. | G11B 27/034 386/278 |
| 2012/0297301 A1* | 11/2012 | Mahoney ............ | G06F 3/04842 715/716 |
| 2014/0152875 A1* | 6/2014 | Tobin ................. | H04N 5/23293 348/239 |

FOREIGN PATENT DOCUMENTS

| | | | |
|---|---|---|---|
| JP | 2007053616 A | 3/2007 |
| JP | 2007221409 A | 8/2007 |
| JP | 2009089220 A | 4/2009 |
| JP | 5180127 B2 | 4/2013 |

\* cited by examiner

*Primary Examiner* — Timothy J Henn
(74) *Attorney, Agent, or Firm* — Holtz, Holtz & Volek PC

(57) ABSTRACT

A shooting apparatus includes an image pickup unit, a frame setting unit that sets frames for arranging a plurality of still images obtained from the picked-up image as a combination photograph before the still images are shot, an object determination unit that determines an object from the picked-up image before the still images are shot, a still image acquisition unit that acquires the still images including the object determined by the object determination unit while the image pickup unit is shooting a moving image, an arrangement unit that arranges the still images acquired by the still image acquisition unit in the frames set by the frame setting unit, and a combining unit that combines the still images acquired by the still image acquisition unit according to the arrangement by the arrangement unit to generate the combination photograph.

14 Claims, 12 Drawing Sheets

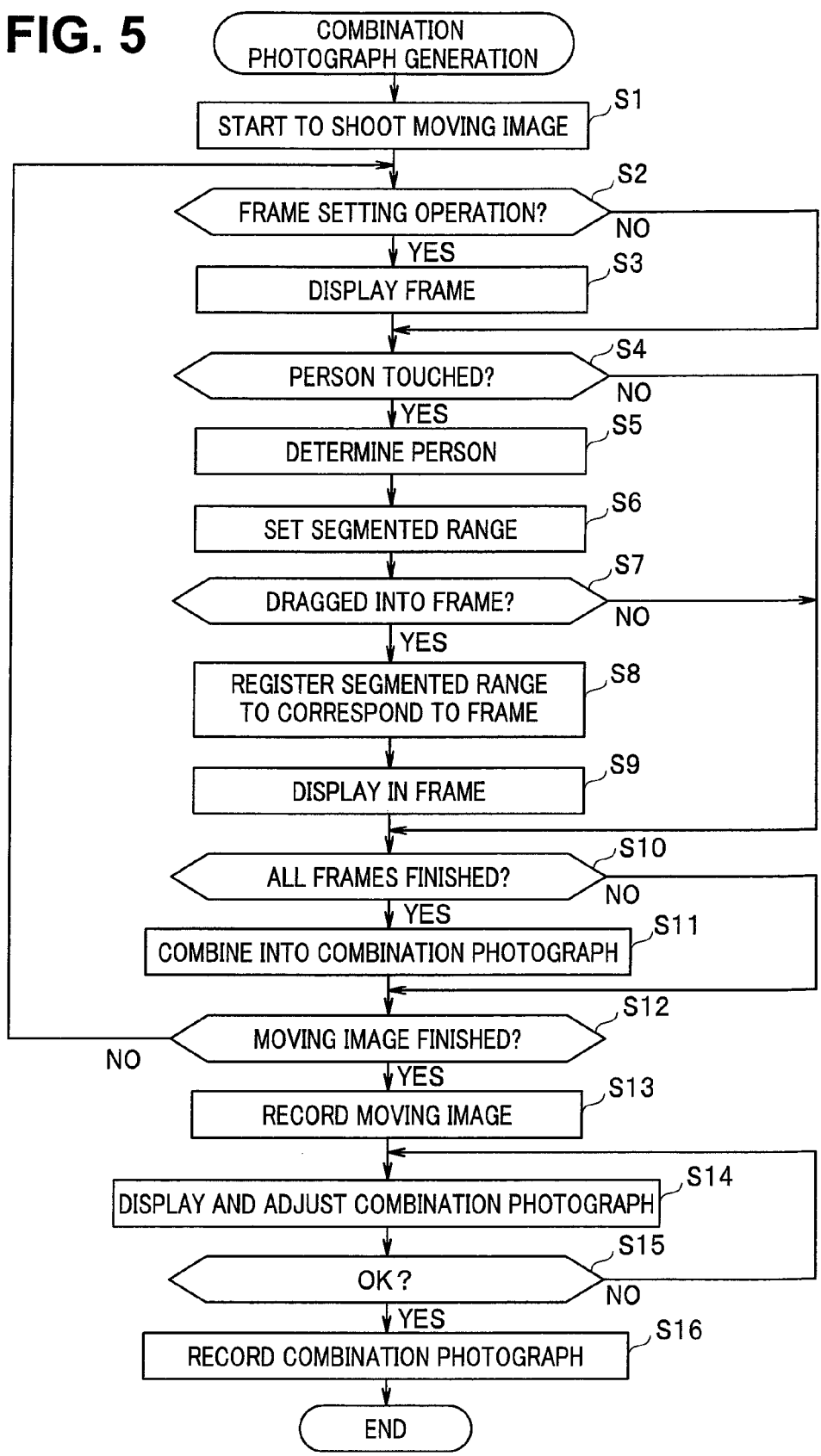

SHOOTING APPARATUS AND SHOOTING METHOD

CROSS REFERENCE TO RELATED APPLICATION

This application claim is benefit of Japanese Application No. 2013-138069 filed in Japan on Jul. 1, 2013, the contents of which are incorporated by this reference.

BACKGROUND OF THE INVENTION

1. Field of the Invention

The present invention relates to a shooting apparatus and a shooting method suitable for a digital camera capable of shooting a still image and a moving image.

2. Description of the Related Art

In recent years, a portable apparatus (shooting apparatus) with a shooting function, such as a digital camera, has spread. The shooting apparatus of this type includes one having a display unit with a function of displaying a shot image, and one that is made easy to operate by displaying a menu screen on a display unit, and further includes one that can be operated by arranging a touch panel on a display unit and performing a touch operation on the touch panel.

There is also a shooting apparatus capable of shooting not only a still image but also a moving image. Further, an apparatus capable of acquiring a still image while shooting a moving image has also been developed. For example, Japanese Patent Application Laid-Open Publication No. 2009-89220 describes an apparatus configured to acquire a still image having a preferable composition when shooting a moving image.

In the shooting apparatus of this type, a technique for using image processing to add various effects to a shot photograph has also been developed. For example, a shooting apparatus that combines a plurality of shot photographs to generate a combination photograph as a single photograph has also been developed.

For example, Japanese Patent No. 5180127 describes an image generation apparatus that records a template for a plurality of types of composite frames, and edits images of the same object to respectively match the composite frames and arranges the edited images in the composite frames.

However, the apparatus described in Japanese Patent No. 5180127 selects, among recorded still pictures, pictures of the same object using the recorded template, edits the selected still pictures, and then arranges the edited still pictures in the composite frames. That is, Japanese Patent No. 5180127 discusses not selecting objects from a movie to generate the selected objects as a combination photograph but selecting still pictures that have already been shot and further selecting some of the selected still pictures, and incorporating the selected still pictures into predetermined positions of the template to generate a desired combination photograph.

SUMMARY OF THE INVENTION

A shooting apparatus according to the present invention includes an image pickup unit that picks up objects to obtain a picked-up image, a frame setting unit that sets frames for arranging a plurality of still images obtained from the picked-up image as a combination photograph based on a photographer's operation before the still images are shot, an object determination unit that determines a object from the picked-up image based on a photographer's object designation operation before the still images are shot, a still image acquisition unit that acquires the still images including the object determined by the object determination unit from the picked-up image while the image pickup unit is shooting a moving image, an arrangement unit that arranges the still images acquired by the still image acquisition unit in the frames set by the frame setting unit based on the photographer's operation, and a combining unit that combines the still images acquired by the still image acquisition unit according to the arrangement by the arrangement unit to generate the combination photograph.

A shooting method according to the present invention includes an image pickup unit picking up objects to obtain a picked-up image, a frame setting unit setting frames for arranging a plurality of still images obtained from the picked-up image as a combination photograph based on a photographer's operation before the still images are shot, an object determination unit determining an object from the picked-up image based on a photographer's object designation operation before the still images are shot, a still image acquisition unit acquiring the still images including the objects determined by the object determination unit from the picked-up image while the image pickup unit is shooting a moving image, an arrangement unit arranging the still images acquired by the still image acquisition unit in the frames set by the frame setting unit based on a photographer's operation, and a combining unit combining the still images acquired by the still image acquisition unit according to the arrangement by the arrangement unit to generate the combination photograph.

A shooting apparatus according to the present invention includes an image pickup unit that picks up objects to output a movie, a display control unit for displaying the movie on a display unit, a frame setting unit that displays frames for arranging a plurality of still images obtained from the movie as a combination photograph on the display unit based on a photographer's operation before the still images are shot while the image pickup unit is shooting a moving image, an object determination unit that determines an object from the movie based on a photographer's object designation operation before the still images are shot, a still image acquisition unit that acquires the still images including the object determined by the object determination unit from the movie while the image pickup unit is shooting the moving image, an arrangement unit that arranges the still images acquired by the still image acquisition unit in the frame displayed on the display unit based on a photographer's operation for designating the frames displayed on the display unit, and a combining unit that combines the still images acquired by the still image acquisition unit according to the arrangement by the arrangement unit to generate the combination photograph.

A shooting apparatus according to the present invention is a shooting apparatus that picks up objects to display a movie on a display unit, which includes a frame setting unit that sets frames for arranging still images as a combination photograph in the movie displayed on the display unit, a frame combining unit that combines the set frames with the movie displayed on the display unit and displays the frames, an image acquisition unit that acquires, when an object in the movie is designated, the designated object in the movie as still pictures based on a photographer's operation, and a combination image generation unit that combines the still pictures acquired by the image acquisition unit with predetermined positions of the frame displayed on the display unit and displays the still pictures, wherein the objects in the movie are combined into the movie as the combination photograph of the still pictures.

The above and other objects, features and advantages of the invention will become more clearly understood from the following description referring to the accompanying drawings.

BRIEF DESCRIPTION OF THE DRAWINGS

FIG. 5 is a flowchart illustrating combination photograph generation processing;

DETAILED DESCRIPTION OF THE PREFERRED EMBODIMENTS

Embodiments of the present invention will be described below with reference to the drawings.
(First Embodiment)

Figure 1:
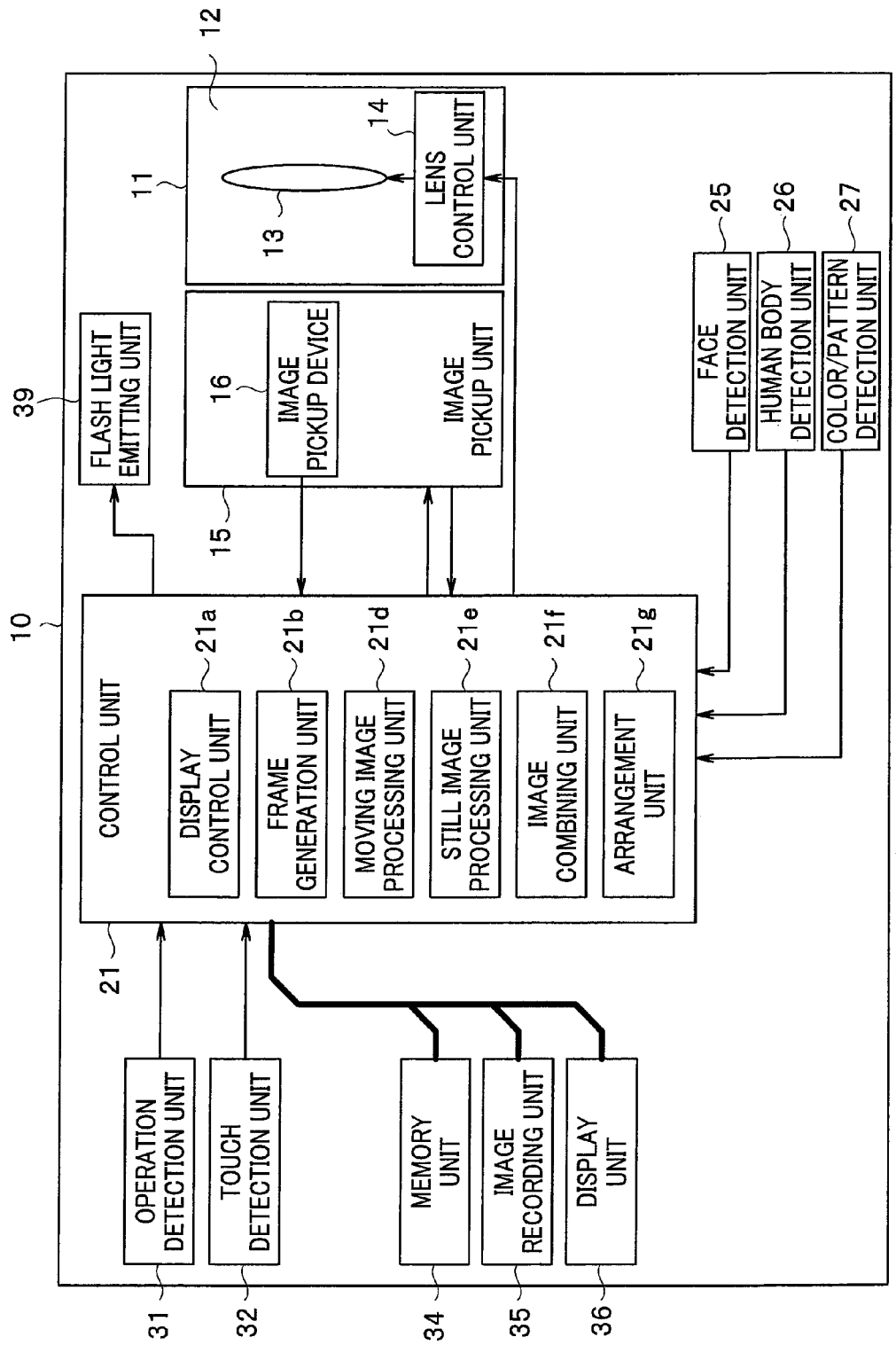
FIG. 1 is a block diagram illustrating a circuit configuration of a shooting apparatus according to a first embodiment of the present invention.

FIG. 1 is a block diagram illustrating a circuit configuration of a shooting apparatus according to a first embodiment of the present invention. The present embodiment enables a combination photograph to be generated using still images desired by a user during recording of a moving image. That is, in the present embodiment, a combination photograph obtained by combining objects desired by the user is generated while being displayed during shooting of a moving image by arranging and displaying images cut from a movie by the user as still images at positions corresponding to a user operation during shooting of the moving image.

A shooting apparatus 10 according to the present embodiment has a lens unit 11 arranged on its front surface. The lens unit 11 includes an optical path unit 12 for guiding an object image to an image pickup unit 15. The optical path unit 12 includes a plurality of lenses 13 and stops (not illustrated) for zooming and focusing. A lens control unit 14 provided in the lens unit 11 is controlled by a control unit 21, described below, to drive the lenses 13 and the stops provided in the optical path unit 12 so that focusing, stop adjustment, and zoom control can be performed.

The image pickup unit 15 including an image pickup device 16 such as a charge coupled device (CCD) or complementary metal oxide semiconductor (CMOS) sensor is provided at a rear end side of the lens unit 11. The image pickup unit 15 photoelectrically converts the object image from the lens unit 11 provided on the front surface, to obtain a picked-up image. The image pickup unit 15 is controlled to be driven by the control unit 21, to output the picked-up image.

The control unit 21 includes a central processing unit (CPU) or a processor, for example, to control each of units in the shooting apparatus 10. The control unit 21 outputs a driving signal for the image pickup device 16 to the image pickup unit 15 while reading out the picked-up image from the image pickup unit 15. The control unit 21 performs predetermined signal processing, e.g., color adjustment processing, matrix conversion processing, noise removal processing, and the other various types of signal processing for the read picked-up image.

An operation detection unit 31 is also disposed in the shooting apparatus 10. The operation detection unit 31 generates an operation signal based on a user operation for an operation portion including a release button, a function button, and various types of switches for setting an image pickup mode (not illustrated) provided in the shooting apparatus 10, and outputs the generated operation signal to the control unit 21. The control unit 21 controls each of the units based on the operation signal.

The control unit 21 can give the picked-up image to an image recording unit 35 to record the picked-up image. In this case, the control unit 21 can compress the picked-up image after signal processing, and give the compressed picked-up image to the image recording unit 35 to record the picked-up image. The image recording unit 35 can use a card interface, for example, and can record image information and voice information on a recording medium such as a memory card.

A display control unit 21a in the control unit 21 performs various types of processing relating to display. The display control unit 21a can give the picked-up image after signal processing to a display unit 36. The display unit 36 has a display screen such as a liquid crystal display (LCD), and displays the picked-up image given from the display control unit 21a. The display control unit 21a can also display various types of menus on the display screen.

The display unit 36 has a display screen 36a (see FIGS. 2A to 2C) on which the picked-up image is displayed. A touch detection unit 32 including a touch panel is provided on the display screen 36a. The touch detection unit 32 can generate an operation signal corresponding to a position on the display screen 36a to which the user has pointed with his/her finger. The operation signal is fed to the control unit 21. Thus, the control unit 21 can detect, when the user touches and slides the display screen 36a, various types of operations such as a touch position by the user, an operation for bringing the finger closer to and apart from the display screen 36a, a slide operation, a position reached by the slide operation, a slide direction, and a period during which the user is touching the display screen 36a, and can perform processing corresponding to the user operation.

Figure 2A:
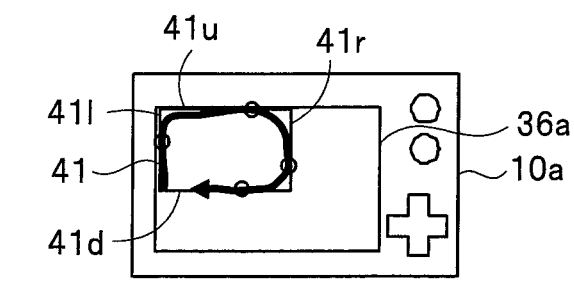
FIGS. 2A to 2C are diagrams each illustrating an example of a method for setting a frame by a frame generation unit 21b.
Figure 2B:
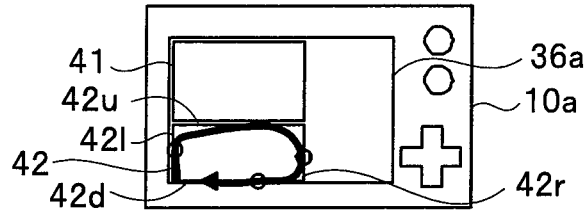
Figure 2C:
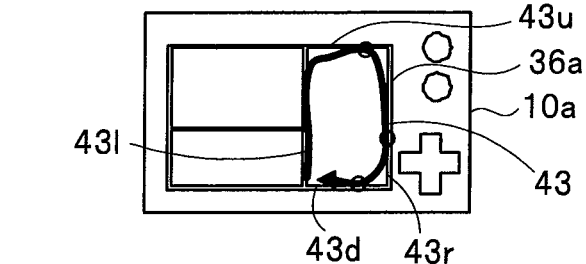

Note that the display unit 36 is disposed to occupy substantially the entire area of a back surface, for example, of the shooting apparatus 10 (see FIGS. 2A to 2C). The photographer can confirm a through image displayed on the display screen 36a of the display unit 36 during shooting, and can perform a shooting operation while confirming the through image.

Note that the shooting apparatus 10 includes a memory unit 34. The control unit 21 uses the memory unit 34 as a working memory while also using the memory unit 34 for temporary recording of the picked-up image. The shooting apparatus 10 includes a flash light emitting unit 39. The flash light emitting unit 39 is controlled by the control unit 21, to emit a flash.

In the present embodiment, the shooting apparatus 10 includes a face detection unit 25, a human body detection unit 26, and a color/pattern detection unit 27. The face detection unit 25 detects the face of a person in the picked-up image by a known face detection method. For example, the face detection unit 25 may use a method for detecting the face of the person by sequentially comparing a plurality of gray scale images obtained by modeling a feature such as brightness of the face with the picked-up image. The face detection unit 25 can also determine a facial expression by using a database storing features such as an angle of the corner of the mouth and an angle of the corner of the eye in a smiling face and shadows of face parts, for example. Further, the face detection unit 25 can also determine the age and the sex of the person picked up by using a database storing feature values of the faces of many people. The face detection unit 25 can also determine a direction in which a detected target such as a face exists (face direction) from a position in the picked-up image of the target.

The human body detection unit 26 can detect a human body and an animal by a similar method to the face detection unit 25. The color/pattern detection unit 27 can detect a designated color/pattern from the picked-up image.

In the present embodiment, the control unit 21 can set a combination photograph generation mode for generating the combination photograph during the shooting of the moving image. In the combination photograph generation mode in the present embodiment, the user can designate frames for respectively defining arrangements of photographs in the combination photograph. A frame generation unit 21b in the control unit 21 sets a plurality of frames each having a predetermined shape, position, and size based on the user operation. For example, the frame generation unit 21b sets the frames by user's touch and slide operations detected by the touch detection unit 32. The frame generation unit 21b may select, among patterns of the plurality of frames previously set, one pattern by a user's selection operation.

FIGS. 2A to 2C are diagrams each illustrating an example of a method for setting a frame by the frame generation unit 21b. FIGS. 3 and 4A to 4C are diagrams each illustrating a state where the setting of frames has ended.

In the combination photograph generation mode, the frame generation unit 21b detects the user's touch and slide operations, to determine a range of the frame. For example, the user performs the slide operation to surround a certain range on the touch detection unit 32 arranged on the display screen 36a of the display unit 36 with his/her finger. The frame generation unit 21b sets as the frame a range surrounded by two vertical lines passing through positions at both ends in a horizontal direction of the range surrounded by the slide operation and two horizontal lines passing through positions at both ends in a vertical direction thereof.

Figure 3:
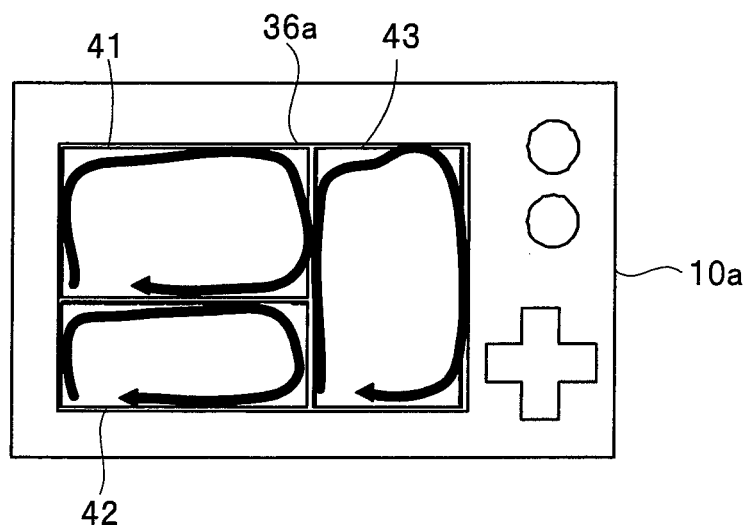
FIG. 3 is a diagram illustrating a state where the setting of the frames has ended.
Figure 4A:
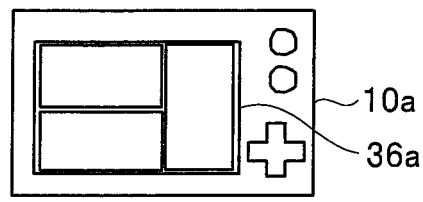
FIGS. 4A to 4C are diagrams each illustrating a state where the setting of the frames has ended.
Figure 4B:
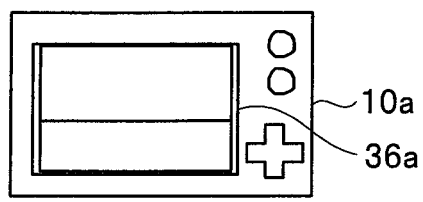
Figure 4C:
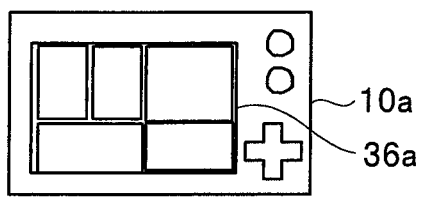

For example, the user performs the slide operation, as indicated by a thick line arrow in FIG. 2A, so that both its ends are detected at positions of round marks. Thus, a range surrounded by a frame 41 having straight lines 41r, 41l, 41u, and 41d becomes an arrangement position of one photograph in the combination photograph. Similarly, the user performs the slide operation to surround a range indicated by a thick line arrow in each of FIGS. 2B and 2C so that upper and lower four corners are detected based on positions of round marks. Thus, ranges respectively surrounded by a frame 42 having straight lines 42r, 42l, 42u, and 42d and a frame 43 having straight lines 43r, 43l, 43u, and 43d become arrangement positions of photographs in the combination photograph. Therefore, the three frames 41 to 43 are set in the display screen 36a, as illustrated in FIG. 3. The size and the position of the frame and the number of divisions can be set, as needed. For example, the display screen 36a may be divided into three, as illustrated in FIG. 4A, may be divided into two, as illustrated in FIG. 4B, and may be further finely set, as illustrated in FIG. 4C.

Further, the user can also perform the slide operation within the frame, which has already been set, to divide the set frame into a plurality of frames and set the plurality of frames as new frames.

Note that the above-mentioned method is one example. The frame generation unit 21b may detect various operations for designating a frame and generate the frame. For example, the user may perform a pinch operation on the touch detection unit 32, to set as a frame a rectangle having a line connecting both end points of the pinch operation as a diagonal. For example, a method for designating a boundary between frames by a straight line may be used. Alternatively, a frame may apparently be designated by not the touch operation but a key or dial operation.

A moving image processing unit 21d controls, when it is instructed to shoot a moving image, the image pickup unit 15, to pick up a movie, and gives the movie from the image pickup unit 15 to the image recording unit 35, to sequentially start to record the movie. When a moving image shooting stop operation is performed, the moving image processing unit 21d files the recorded movie.

In the present embodiment, the control unit 21 includes a still image processing unit 21e capable of picking up a still image when the moving image processing unit 21d shoots the moving image. The still image processing unit 21e can give, when it is instructed to pick up the still image by a release operation of a release button (not illustrated) and a touch operation on the touch detection unit 32, the picked-up image from the image pickup unit 15 as a still picture to the image recording unit 35.

In the present embodiment, an arrangement unit 21g in the control unit 21 performs object arrangement processing for determining in which of frames an object to be designated by the user is arranged during the combination photograph generation mode. The arrangement unit 21g controls the face detection unit 25, the human body detection unit 26, and the color/pattern detection unit 27 to detect an object in response to an object touch operation on the display screen 36a, and performs object arrangement processing for arranging the detected object in the frame designated by the user during the combination photograph generation mode.

The arrangement unit 21g controls a still image processing unit 21e in the object arrangement processing, to set a predetermined segmented range including the object designated by the user's touch operation and temporarily record images within the segmented range in the memory unit 34 to correspond to frames. The user designates objects for all the frames so that the images respectively corresponding to all the frames in the combination photograph are temporarily recorded in the memory unit 34. If the objects have not been designated for some of the frames, the arrangement unit 21g may fit any image such as an entire photograph or a background in the frames for which the objects have not been designated.

An image combining unit 21f can combine the images in the segmented range temporarily recorded in the memory unit 34, to generate a single combination photograph. The image combining unit 21f gives the generated combination photograph to the image recording unit 35 to record the given combination photograph. Note that the image combining unit 21*f* can make the size of the segmented range in the still image processing unit 21*e* larger than the size of each of the frames to move the image in the frame in generating the combination photograph, or can also increase or decrease the size of the segmented range to an appropriate size. For example, the size of the segmented range may be increased or decreased in response to the user's pinch operation.

Note that the display control unit 21*a* can perform image display corresponding to the object arrangement processing in the still image processing unit 21*e*. That is, the display control unit 21*a* can thumbnail-display the frames in which the combination photograph is arranged on a display of the moving image that is being recorded while the moving image is being recorded, and reduce segmented images and display the reduced images in the frames.

Operations according to the embodiment thus configured will be described below with reference to FIG. 5 and FIGS. 6A to 6C. FIG. 5 is a flowchart each illustrating combination photograph generation processing, and FIGS. 6A to 6C are diagrams each illustrating a combination photograph generation operation.

In the present embodiment, the combination photograph is generated when the moving image is shot. When the user performs a moving image shooting start operation, the moving image processing unit 21*d* in the control unit 21 controls the image pickup unit 15 to start to shoot the moving image. The image pickup unit 15 picks up an object, and outputs a picked-up image to the control unit 21. The moving image processing unit 21*d* in the control unit 21 gives the picked-up image to the image recording unit 35 to start to record the picked-up image (step S1).

In the present embodiment, in step S2, the frame generation unit 21*b* determines whether the user has performed a frame setting operation. When the user performs a slide operation on the touch detection unit 32, for example, the frame generation unit 21*b* determines that the user's slide operation is the frame setting operation, to set frames.

Figure 6A:
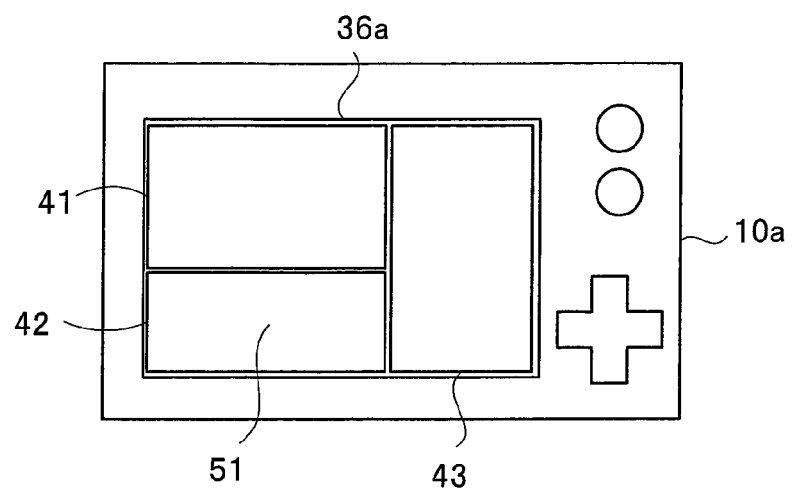
FIGS. 6A to 6C are diagrams each illustrating a combination photograph generation operation.
Figure 6B:
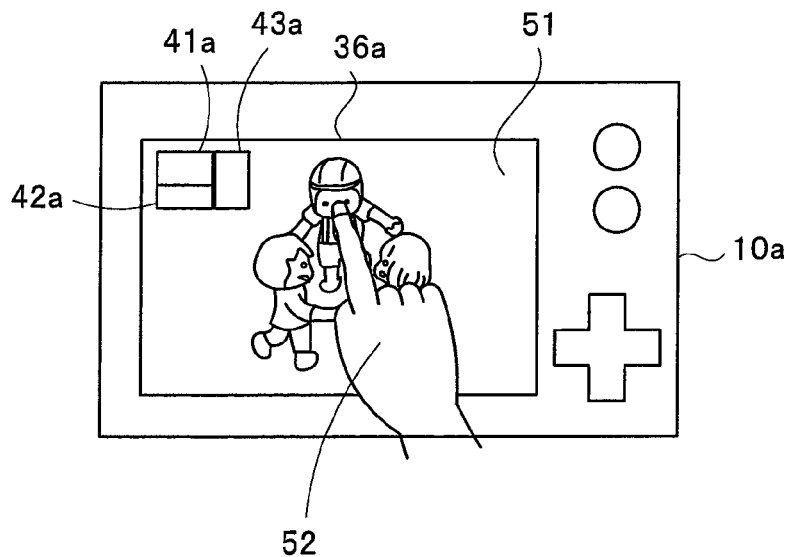
Figure 6C:
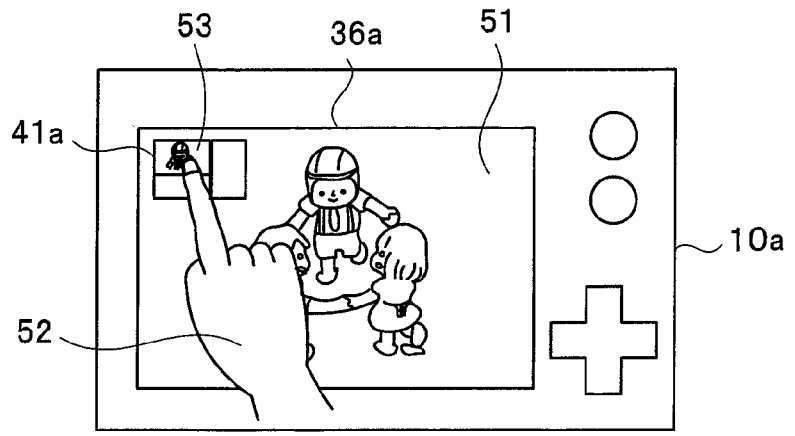

FIG. 6A illustrates frames 41 to 43 set by the user. On the display screen 36*a* of the display unit 36, a moving image, which is currently being picked up, is displayed as a live image 51 (not illustrated in FIG. 6A). The user performs a slide operation on the display screen 36*a*, to set the frames 41 to 43 illustrated in FIG. 6A. If the frame generation unit 21*b* determines that the setting of the frames has ended, then, the frame generation unit 21*b* finalizes the frames, and thumbnail-displays the frames on the display screen 36*a* (step S3). Frames 41*a* to 43*a* illustrated in FIG. 6B respectively represent thumbnails of the frames 41 to 43 displayed on the display screen 36*a*.

In step S4, the arrangement unit 21*g* then determines whether the user has designated an image to be fitted in the frame of the combination photograph, for example, the user has touched an image portion of a person in the live image 51 on the display screen 36*a*. If the arrangement unit 21*g* determines that the user has performed an operation for designating the image to be fitted in the frame of the combination photograph, then, the arrangement unit 21*g* detects the image portion of the person based on outputs of the face detection unit 25, the human body detection unit 26, and the color/pattern detection unit 27 (step S5).

The arrangement unit 21*g* then sets a predetermined segmented range including the detected person (step S6). For example, when the user touches a person at the center of the live image 51 with a finger of his/her hand 52, an image portion of the person is detected, and a predetermined segmented range including the image portion is set. The arrangement unit 21*g* then determines whether the user has dragged the finger, with which the user has touched the person, onto the frame (step S7). If the user has dragged the finger onto the frame, then, the arrangement unit 21*g* controls the still image processing unit 21*e*, to store an image in the segmented range in the memory unit 34 to correspond to the frame onto which the user has dragged the finger (step S8).

FIG. 6C indicates that the user has dragged the finger of the hand 52 onto the frame 41*a*. In this case, the arrangement unit 21*g* stores the image in the segmented range to correspond to the frame 41*a*. The arrangement unit 21*g* further gives the image in the segmented range to the display control unit 21*a*, to thumbnail-display the image in the segmented range in the frame 41*a* (step S9). Thus, the user can confirm how a still image selected as one photograph in the combination photograph by himself/herself has been fitted in the frame designated by himself/herself.

In step S10, the control unit 21 determines whether photographs in the combination photograph have been respectively assigned to all the frames (step S10). If the photographs have not yet been assigned to all the frames, then in step S12, the control unit 21 determines whether a moving image shooting end operation has been performed. If the moving image shooting end operation has not been performed, the processing returns to step S2, to repeat the processing. Note that the processing returns to step S2 so that the frames can be reset.

The user can designate the object liked by himself/herself at a timing liked by himself/herself while seeing the live image 51 recorded as the moving image, and select each of still images used for the combination photograph.

If the photographs in the combination photograph have been assigned to all the frames, then, the image combining unit 21*f* combines the photographs stored in the memory unit 34 to obtain the combination photograph (step S11). If the moving image shooting end operation has been performed, the processing proceeds to step S13. In step S13, the control unit 21 files the movie recorded on the image recording unit 35.

In step S14, the display control unit 21*a* then full-screen displays the combination photograph, which has been obtained by the combining in the image combining unit 21*f*, on the display screen 36*a*. The image combining unit 21*f* can adjust a size and a position of each of the still images recorded on the memory unit 34 relative to the frame, to recombine the photographs according to the user operation. That is, the user can change a size and an arrangement position of each of the still images while seeing the combination photograph displayed on the display screen 36*a*.

For example, the user can change, by touching the frame 41*a* and sliding his/her finger in a predetermined direction, a position of a still image in the frame 41*a* depending on a direction and an amount of the sliding. The user can enlarge or reduce, by performing a pinch operation in the frame 41*a*, a size of a photograph in the frame 41*a* depending on a direction and an amount of the pinch.

If the user has performed a finalization operation, the processing proceeds from step S15 to step S16. In step S16, the image combining unit 21*f* finalizes the combining of the photographs while giving the combination photograph obtained by the combining to the image recording unit 35 to record the combination photograph.

Thus, in the present embodiment, the still image to be arranged in each of the frames in which the photographs in the combination photograph are respectively arranged can be selected by determining the frame based on the user operation and arranging the person designated by the user at the timing designated thereby during the shooting of the moving image.

The frames in which the combination photograph is arranged can be set by the operation for sliding the finger on the screen and surrounding the screen, the still images selected as the combination photograph can be determined by a significantly simple operation for the user to designate the objects in the displayed live image with his/her finger, and the combination photograph using the still images shot in a composition and at a timing desired by the user can be generated in a significantly simple manner.

(Second Embodiment)

Figure 7:
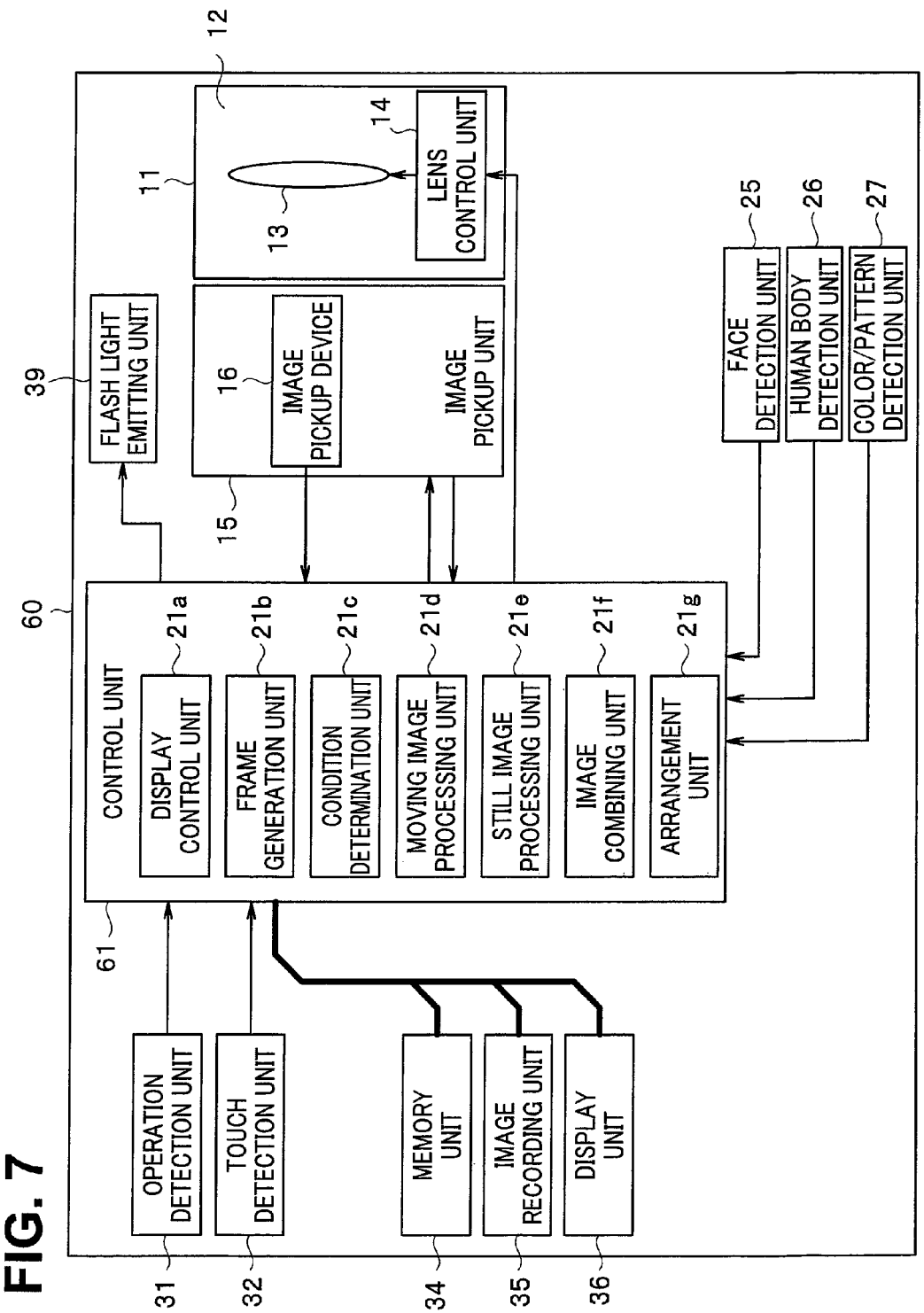
FIG. 7 is a block diagram illustrating a second embodiment of the present invention.

FIG. 7 is a block diagram illustrating a second embodiment of the present invention. In FIG. 7, the same components as those illustrated in FIG. 1 are assigned the same reference numerals, and hence description thereof is not repeated. In the first embodiment, an example in which a user designates a timing at which still images used for a combination photograph are acquired from a movie has been described. In the present embodiment, an object designated by a user is automatically acquired according to a predetermined condition.

A shooting apparatus 60 according to the present embodiment differs from the shooting apparatus 10 illustrated in FIG. 1 in that a control unit 61 having a condition determination unit 21c added therein is used. The condition determination unit 21c sets a condition under which each of still images used for a combination photograph is acquired (hereinafter referred to as a still image acquisition condition) while determining whether an image that matches the still image acquisition condition is included in a movie during shooting of a moving image and acquiring the image as the still image used for the combination photograph when the image is included in the movie. The still image acquisition condition includes a facial expression, a body position, and a composition of the object.

Figure 8A:
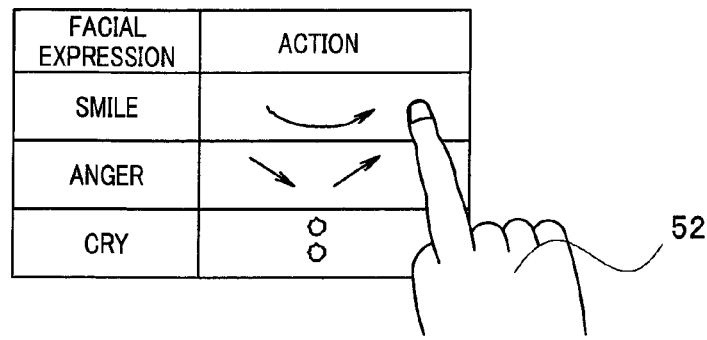
FIGS. 8A and 8B are diagrams each illustrating a condition determination unit 21c.
Figure 8B:
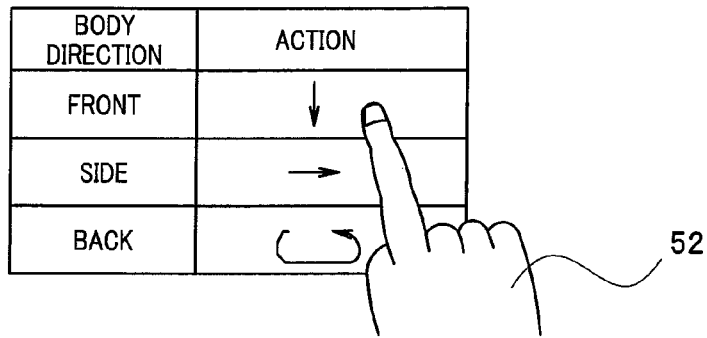
Figure 9:
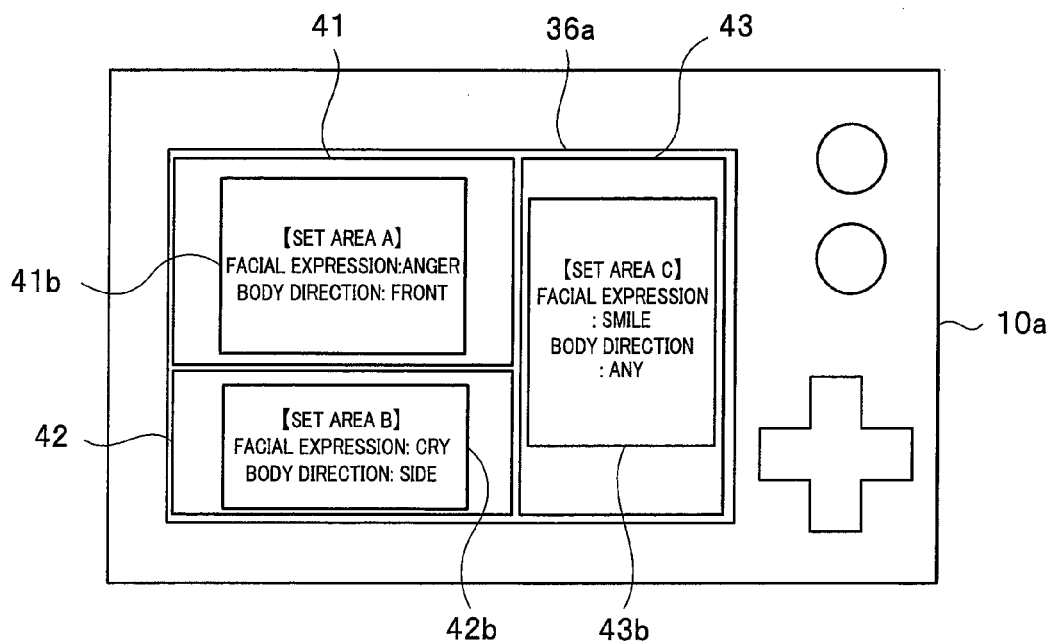
FIG. 9 is a diagram illustrating the condition determination unit 21c.

FIGS. 8A, 8B, and 9 are diagrams each illustrating the condition determination unit 21c. The condition determination unit 21c generates a table describing a relationship between each frame and a still image acquisition condition to be set based on a user operation. The still image acquisition condition is set by detecting an action using a user's touch operation. FIGS. 8A and 8B illustrate a relationship between a still image acquisition condition to be set by the condition determination unit 21c and an action. When the user performs touch and slide operations illustrated in FIGS. 8A and 8B on a touch detection unit 32, the condition determination unit 21c determines a corresponding still image acquisition condition.

FIG. 8A illustrates an action for determining a still image acquisition condition relating to a facial expression, and FIG. 8B illustrates an action for determining a still image acquisition condition relating to a body direction. If a user performs a slide operation in a circular arc shape the center of which falls on the touch detection unit 32 with a finger of his/her hand 52, for example, the condition determination unit 21c sets the facial expression "smile" as a still image acquisition condition for a still image used for a combination photograph. If the user performs a slide operation in a linear shape downward from above on the touch detection unit 32 with the finger of the hand 52, the condition determination unit 21c sets the body direction "front" as the still image acquisition condition for the still image used for the combination photograph.

When the user performs the actions illustrated in FIGS. 8A and 8B on frames 41 to 43 displayed on a display screen 36a illustrated in FIG. 9, for example, the condition determination unit 21c sets a relationship between the frame on which the action has been performed and the still image acquisition condition set by the action. The condition determination unit 21c gives the still image acquisition condition set for each of the frames to the display control unit 21a, to display condition displays 41b to 43b, respectively, on the frames 41 to 43.

Figure 10:
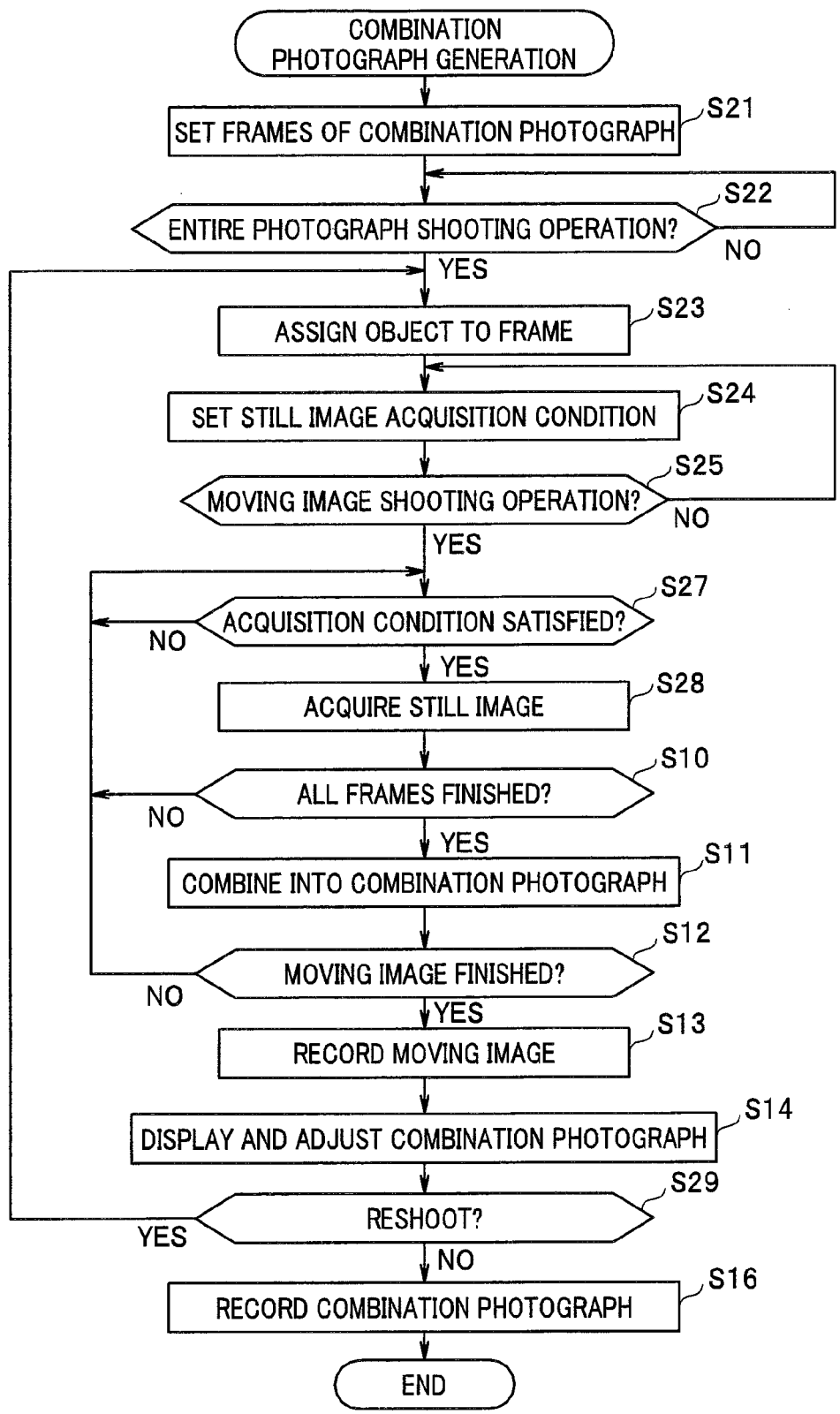
FIG. 10 is a flowchart illustrating combination photograph generation processing.
Figure 11:
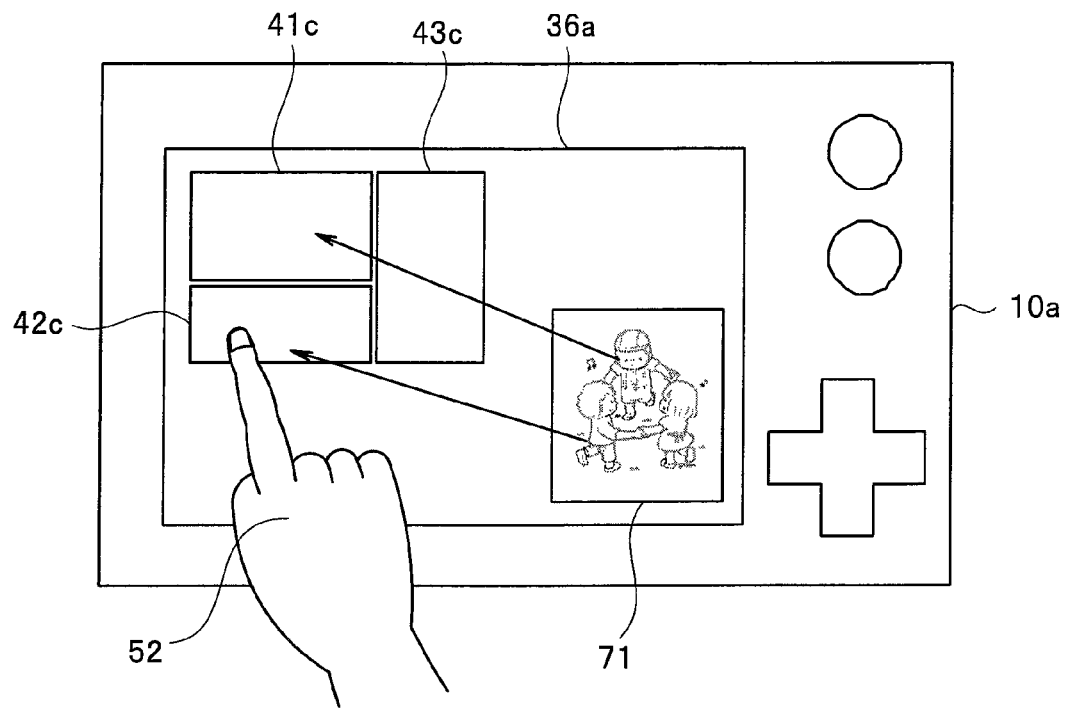
FIG. 11 is a diagram illustrating operations in the second embodiment.
Figure 12:
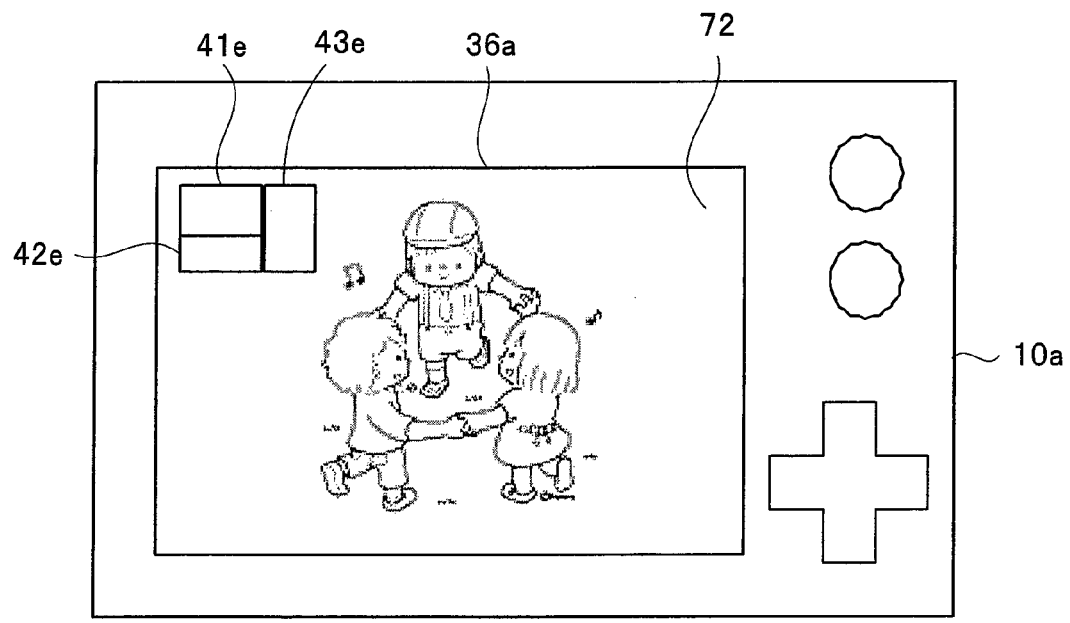
FIG. 12 is a diagram illustrating operations in the second embodiment.
Figure 13:
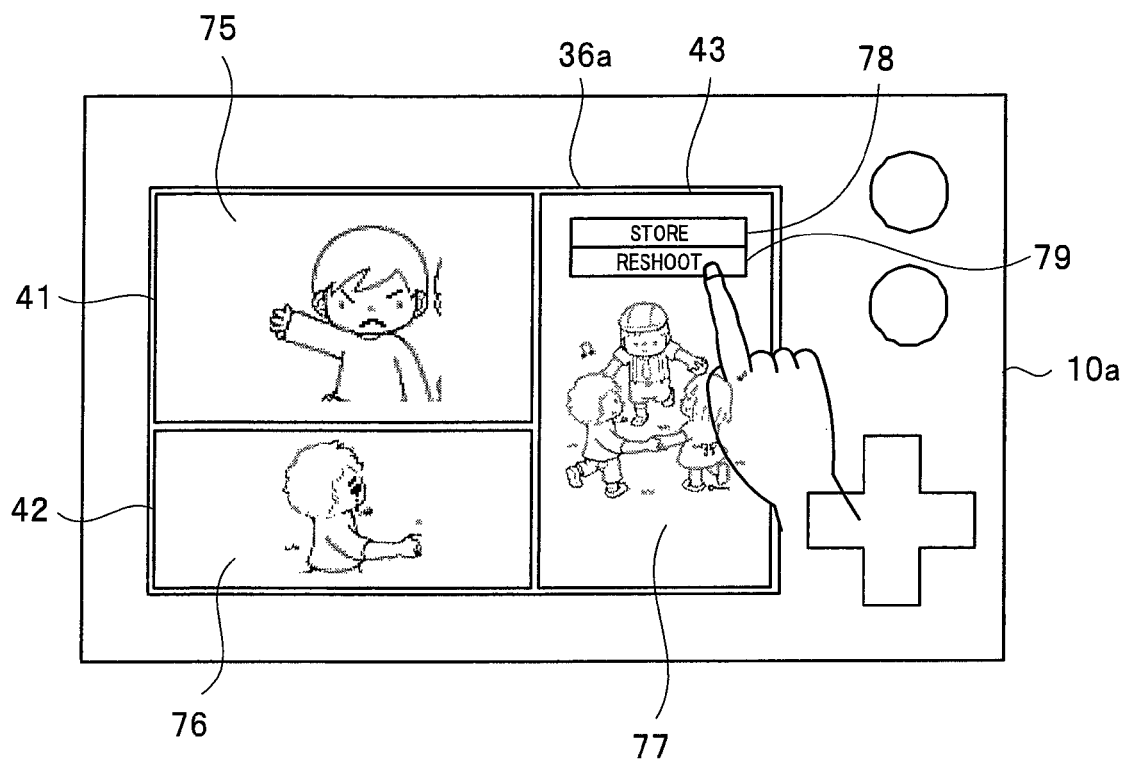
FIG. 13 is a diagram illustrating operations in the second embodiment.

Operations in the embodiment thus configured will be described below with reference to FIGS. 10 to 13. FIG. 10 is a flowchart illustrating combination photograph generation processing. In FIG. 10, the same procedures as those illustrated in FIG. 5 are assigned the same step numbers, and hence description thereof is not repeated. FIGS. 11 to 13 are diagrams each illustrating operations in the second embodiment.

While a combination photograph is also generated when the moving image is shot in the present embodiment, a still image acquisition condition is set before the moving image is shot. In the present embodiment, a frame generation unit 21b sets a frame based on a user operation before the moving image is shot (step S21). The frame generation unit 21b sets the frame using the method described in FIGS. 2A to 2C and FIGS. 4A to 4C, for example. In step S22, an arrangement unit 21g then determines whether a still image shooting operation has been performed.

To set objects used for the combination photograph, the user shoots a still image so that all the objects used for the combination photograph are included therein. When the shooting operation is performed, the arrangement unit 21g controls a display control unit 21a for the user to perform an object assignment operation, to display thumbnails of frames and a thumbnail of the still image shot by the user on the display screen 36a.

FIG. 11 is a diagram illustrating such a state. As illustrated in FIG. 11, thumbnailed frames 41c to 43c are displayed while a thumbnail 71 of a still image is displayed on the display screen 36a. The arrangement unit 21g determines, by a user operation for touching objects in the thumbnail 71 of the still image and dragging the touched objects onto the frame, the object to be assigned to each of the frames 41c to 43c (step S23). For example, in FIG. 11, arrows illustrate that a person at the center of the thumbnail 71 of the still image is assigned to the frame 41c, and a person on the left side thereof is assigned to the frame 42c.

When the arrangement unit 21g finishes registering the person to each of the frames, the condition determination unit 21c then detects the person registered by the user. The condition determination unit 21c further sets a still image acquisition condition for each of the frames in response to the user operation described in FIGS. 8A, 8B, and 9, for example (step S24). If the setting of the still image acquisition conditions for all the frames ends, then in step S25, the condition determination unit 21c enters a standby state of a moving image shooting start operation.

When the user performs the moving image shooting start operation, a movie from an image pickup unit 15 is displayed as a live image 72 on the display screen 36a while thumbnails 41e to 43e of the frames are displayed on the live image 72, as illustrated in FIG. 12. The condition determination unit 21c follows the object selected by the user from a picked-up image, and determines whether the object matches the still image acquisition condition (step S27). If the object that is being followed matches the still image acquisition condition, then, the condition determination unit 21c segments a predetermined range including the object as a still image, and stores the still image in a memory unit 34 to correspond to the frame (step S28).

Note that in the present embodiment, a still image processing unit 21e also gives an image in the segmented range to the display control unit 21a, to thumbnail-display the image in the segmented range in the frame. Thus, the user can confirm how the still image selected as one photograph in the combination photograph by himself/herself is fitted in the frame designated by himself/herself.

The flow in step S10 and the subsequent steps is similar to that in the first embodiment. Note that in combination photographs display/adjustment processing in step S14, it can also be selected whether a generated combination photograph is stored or reshot. FIG. 13 illustrates a display in this case. The generated combination photograph is displayed on the display screen 36a. A still image 75 is displayed in a frame 41, a still image 76 is displayed in a frame 42, and a still image 77 serving as an entire image is displayed in a frame 43. A button display 78 for designating storage and a button display 79 for designating reshooting are displayed on the display screen 36a. If the user selects the button display 79, the processing returns from step S29 to step S23, to assign the object, designate the still image acquisition condition again, and regenerate the combination photograph.

In the present embodiment, the user designates the frames in which the combination photograph is arranged, designates the object assigned to each of the frames, and sets the still image acquisition conditions so that the combination photograph is automatically generated while the moving image is being shot. Thus, the user can concentrate on the shooting of the moving image, and can record an ideal movie and simultaneously generate the combination photograph using the still images shot in a composition and at a timing desired by the user.

(Third Embodiment)

Figure 14:
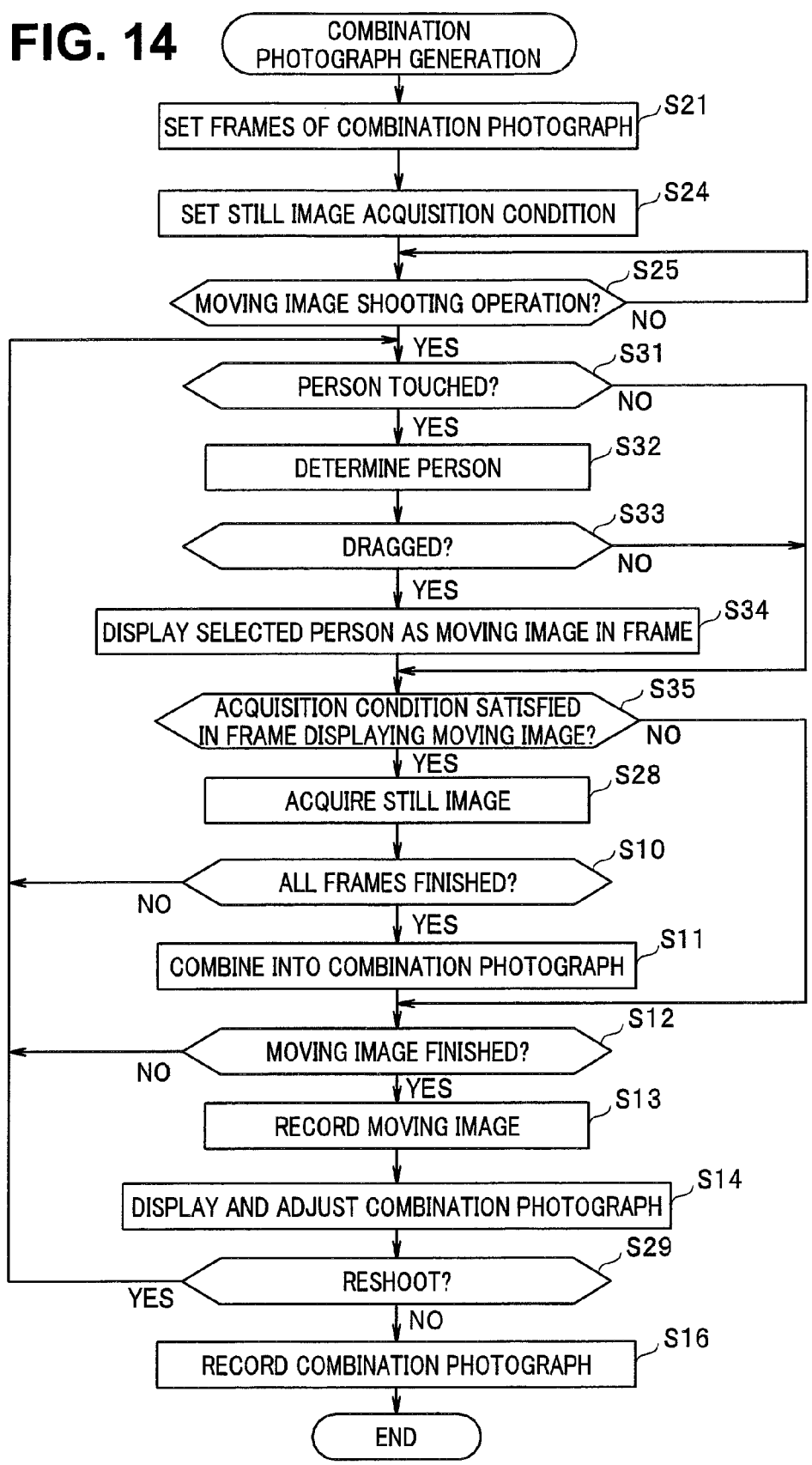
FIG. 14 is a flowchart illustrating a third embodiment of the present invention.

FIG. 14 is a flowchart illustrating a third embodiment of the present invention. In FIG. 14, the same procedures as those illustrated in FIG. 1 are assigned the same step numbers, and hence description thereof is not repeated. A hardware configuration in the present embodiment is similar to that in the second embodiment. Although an example in which frames are designated, and an object assigned to each of the frames is designated, and a still image acquisition condition for each of the objects is set before shooting of a moving image is started has been described in the second embodiment, an example in which frames and still image acquisition conditions are set before shooting of a moving image is started and objects are selected after the shooting of the moving image is started is illustrated in the present embodiment.

In the present embodiment, in step S21, a frame generation unit 21b sets frames of a combination photograph, and then the processing proceeds to step S24 without steps S22 and S23 illustrated in FIG. 10 being performed. In step S24, a condition determination unit 21c sets a still image acquisition condition. In step S25, if the moving image shooting operation has been started, a display control unit 21a displays a live image on a display screen 36a of a display unit 36.

In the present embodiment, an arrangement unit 21g determines whether a person as an object in the live image has been touched in this state (step S31). If a user has touched the person in the live image to designate people used for the combination photograph, then, the arrangement unit 21g determines the touched person based on outputs of a face detection unit 25, a human body detection unit 26, and a color/pattern detection unit 27 (step S32).

The arrangement unit 21g then determines whether a drag operation for dragging the person touched by the user into the frame has been performed (step S33). If the drag operation has been performed, then, the arrangement unit 21g segments a predetermined range including the person, and controls the display control unit 21a to display the person as a moving image in the frame (step S34).

If the arrangement unit 21g finishes setting the object in the frame, then, the condition determination unit 21c follows the object that has been displayed as a moving image in the frame, and determines whether the object matches the still image acquisition condition (step S35). If the object that is being followed matches the still image acquisition condition, then, the condition determination unit 21c segments a predetermined range including the object as a still image, and stores the still image in the memory unit 34 to correspond to the frame (step S28). The display control unit 21a displays the acquired still image in the frame.

In step S10, the control unit 21 determines whether still images used for photographs in the combination photograph have been respectively acquired in all the frames. If the acquisition of the still images in all the frames does not end, the processing returns to step S31. The processing in steps S31 to S35 and step S28 is then repeated. That is, a movie including the person designated in the frame is displayed by an operation for the user to designate and drag the person, and the still image acquisition condition is satisfied so that the movie displayed in the frame is replaced with a still image after the acquisition condition is satisfied.

When all the still images are thus acquired, an image combining unit 21f combines the photographs into the combination photograph. The other function is similar to that in the second embodiment.

Thus, in the present embodiment, the frames and the still image acquisition conditions are previously determined so that the combination photograph can automatically be generated while the moving image is being shot by a simple operation for only touching and dragging the objects used for the combination photograph. Thus, in the present embodiment, the user can also concentrate on the shooting of the moving image, and can record an ideal movie and simultaneously generate the combination photograph using the still images shot in a composition and at a timing desired by the user.

Note that while an example in which one type of pattern of frames is designated and a still image acquisition condition corresponding to each of the frames is set has been described in each of the above-mentioned embodiments, a plurality of combination photographs may be simultaneously generated by setting one or a plurality of types of patterns of frames and setting a still image acquisition condition for each of the frames.

Figure 15:
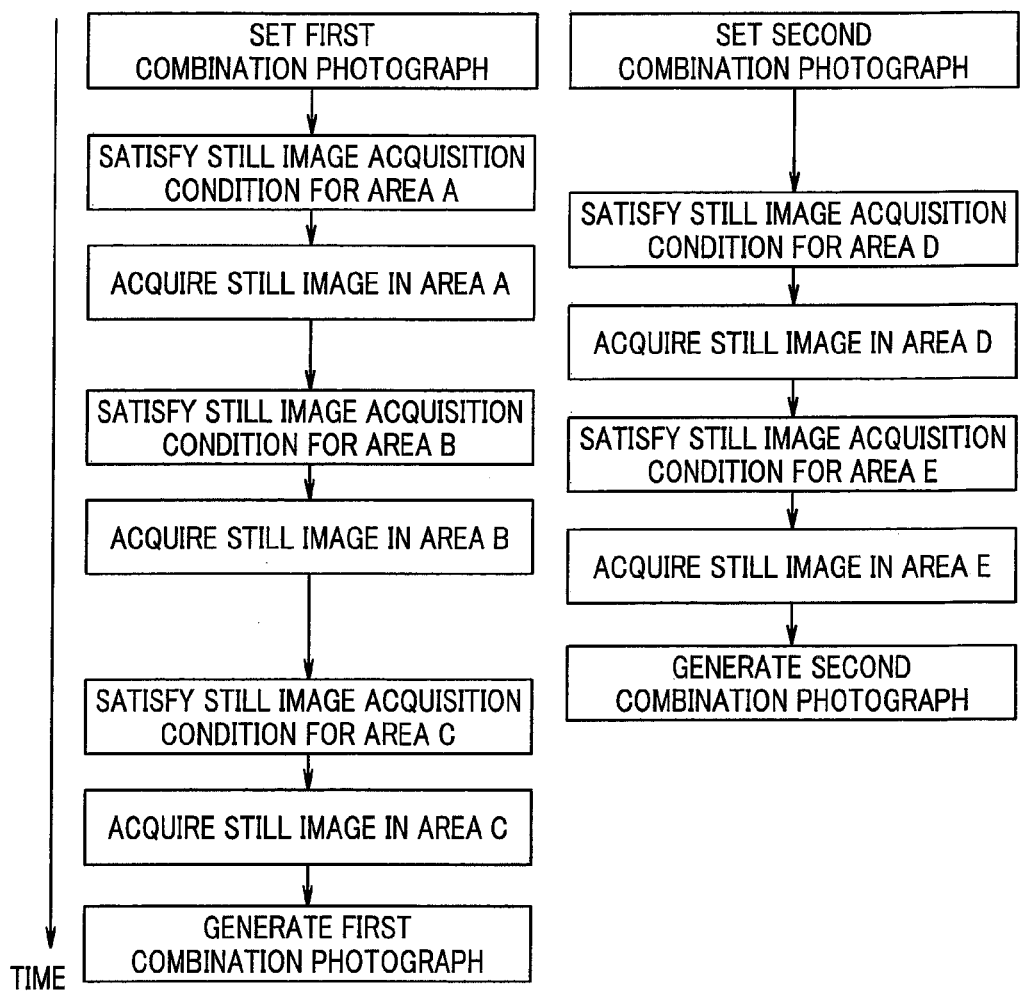
FIG. 15 is a flowchart illustrating operations performed when a plurality of settings is performed.

FIG. 15 is a flowchart illustrating operations in this case. In an example illustrated in FIG. 15, a first combination photograph includes three frames of areas A to C, and a second combination photograph includes two frames of areas D and F. As illustrated in FIG. 15, still image acquisition conditions are sequentially determined according to setting of each of the first and second combination photographs.

Thus, in each of the above-mentioned embodiments, the plurality of combination photographs can be set simultaneously (concurrently).

Further, while a digital camera has been described as an apparatus for shooting in each of the above-mentioned embodiments of the present invention, the camera may be a digital single-lens reflex camera or a compact digital camera, may be a camera for a moving image such as a video camera or a movie camera, and may be further a camera built in a personal digital assist (PDA) such as a mobile phone or a smart phone. Alternatively, the camera may be an industrial or medical optical apparatus such as an endoscope or a microscope, and may be a monitoring camera or a stationary camera, e.g., a camera mounted on a television receiver or a personal computer.

The present invention is not limited to each of the above-mentioned embodiments, and can be embodied by deforming components without departing from the scope of the present invention in an implementation phase. Various inventions can be formed by combining a plurality of components described in each of the above-mentioned embodiments, as needed. For example, some of all the components described in the embodiment may be deleted. Further, the components over the different embodiments may be combined, as needed.

Note that even if operation flows in the claim, the specification, and the drawings are described using "first" and "then" for convenience, this does not mean that it is essential to implement the operation flows in this order. It goes without saying that some of steps composing each of the operation flows, which do not affect the essence of the invention, can also be omitted, as needed.

Many of controls and functions, mainly described in the flowcharts, in the technique described herein can be set by a program, and a computer reads and executes the program so that the above-mentioned controls and functions can be implemented. The whole or a part of the program can be recorded or stored, as a computer program product, in a portable medium such as a nonvolatile memory, e.g., a flexible disk or a compact disk read only memory (CD-ROM), or a storage medium such as a hard disk or a volatile memory, and can be circulated or provided during product shipment or via the portable medium or a communication line. A user can easily implement the shooting apparatus according to the present embodiment by downloading the program via a communication network and installing the program into the computer or installing the program into the computer from the recording medium.

What is claimed is:

1. A shooting apparatus comprising:
   an image pickup unit that picks up objects to obtain a picked-up image;
   a frame setting unit that sets frames for arranging a plurality of still images obtained from the picked-up image as a combination photograph based on a photographer's operation before the still images are shot;
   an object determination unit that determines an object from the picked-up image based on a photographer's object designation operation before the still images are shot;
   a still image acquisition unit that acquires the still images including the object determined by the object determination unit from the picked-up image while the image pickup unit shoots a moving image;
   an arrangement unit that arranges the still images acquired by the still image acquisition unit in the frames set by the frame setting unit based on a photographer's operation to form an arrangement; and
   a combining unit that combines the still images acquired by the still image acquisition unit according to the arrangement formed by the arrangement unit to generate the combination photograph;
   wherein the frame setting unit sets the frame based on a photographer's operation on a display screen on which the picked-up image is displayed while the image pickup unit shoots the moving image.

2. The shooting apparatus according to claim 1, wherein the still image acquisition unit acquires, at a timing responsive to an operation for designating the object in the picked-up image, the still image including the object designated by the operation while the image pickup unit shoots the moving image.

3. The shooting apparatus according to claim 1, wherein the still image acquisition unit acquires, when an object in the picked-up image satisfies a predetermined still image acquisition condition, the still image including the object satisfying the condition while the image pickup unit shoots the moving image.

4. The shooting apparatus according to claim 3, wherein the still image acquisition unit determines, based on an operation for designating the object in the picked-up image, the object serving as a determination target of the still image acquisition condition before the image pickup unit shoots the moving image.

5. The shooting apparatus according to claim 3, wherein the still image acquisition unit determines, based on an operation for designating the object in the picked-up image, the object serving as a determination target of the still image acquisition condition while the image pickup unit is shooting the moving image.

6. The shooting apparatus according to claim 1, further comprising:
   a condition determination unit that sets a still image acquisition condition serving as a condition for the still image acquisition unit to acquire the still image based on a photographer's operation.

7. The shooting apparatus according to claim 1, wherein the arrangement unit determines the frame on which the still image to be acquired by the still image acquisition unit is arranged based on a photographer's operation on the display screen while the image pickup unit shoots the moving image.

8. The shooting apparatus according to claim 1, wherein the frame setting unit sets the frame based on a photographer's operation on the display screen before the image pickup unit shoots the moving image.

9. The shooting apparatus according to claim 1, wherein the arrangement unit determines the frame on which the still image to be acquired by the still image acquisition unit is arranged based on a photographer's operation before the image pickup unit shoots the moving image.

10. A shooting apparatus comprising:
    an image pickup unit that picks up objects to obtain a picked-up image;
    a frame setting unit that sets frames for arranging a plurality of still images obtained from the picked-up image as a combination photograph based on a photographer's operation before the still images are shot;
    an object determination unit that determines an object from the picked-up image based on a photographer's object designation operation before the still images are shot;
    a still image acquisition unit that acquires the still images including the object determined by the object determination unit from the picked-up image while the image pickup unit shoots a moving image;
    an arrangement unit that arranges the still images acquired by the still image acquisition unit in the frames set by the frame setting unit based on a photographer's operation to form an arrangement; and
    a combining unit that combines the still images acquired by the still image acquisition unit according to the arrangement formed by the arrangement unit to generate the combination photograph;
    wherein the frame setting unit sets the frame based on an operation for surrounding a touch detection area arranged on a display screen on which the picked-up image is displayed.

11. A shooting apparatus comprising:
    an image pickup unit that picks up objects to output a movie;

a display control unit for displaying the movie on a display unit;

a frame setting unit that displays frames for arranging a plurality of still images obtained from the movie as a combination photograph on the display unit based on a photographer's operation before the still images are shot while the image pickup unit shoots a moving image;

an object determination unit that determines an object from the movie based on a photographer's object designation operation before the still images are shot;

a still image acquisition unit that acquires the still images including the object determined by the object determination unit from the movie while the image pickup unit is shooting the moving image;

an arrangement unit that arranges the still images acquired by the still image acquisition unit in the frames displayed on the display unit based on a photographer's operation for designating the frames displayed on the display unit to form an arrangement;

a combining unit that combines the still images acquired by the still image acquisition unit according to the arrangement formed by the arrangement unit to generate the combination photograph; and a touch panel, provided in the display unit, for detecting a photographer's operation;

wherein the frame setting unit displays on the display unit a frame in a shape corresponding to a photographer's slide operation on the touch panel.

12. The shooting apparatus according to claim 11, wherein the arrangement unit arranges the still images in the frames according to the photographer's slide operation from display of the object to the display of the frames on the touch panel.

13. The shooting apparatus according to claim 11, wherein the arrangement unit thumbnail-displays the still images acquired from the movie by the still image acquisition unit in the frames.

14. A shooting method comprising:

operating an image pickup unit to pick up objects to obtain a picked-up image;

setting frames for arranging a plurality of still images obtained from the picked-up image as a combination photograph based on a photographer's operation before the still images are shot;

determining an object from the picked-up image based on a photographer's object designation operation before the still images are shot;

acquiring the still images including the determined object from the picked-up image while the image pickup unit shoots a moving image;

arranging the acquired still images in the set frames based on a photographer's operation to form an arrangement; and combining the acquired still images according to the arrangement to generate the combination photograph;

wherein the frame is set based on an operation for surrounding a touch detection area arranged on a display screen on which the picked-up image is displayed.

* * * * *